United States Patent [19]
Vanasse et al.

[11] Patent Number: 5,539,960
[45] Date of Patent: Jul. 30, 1996

[54] CYLINDRICAL CONVEX DOORKNOB TERMINATION

[75] Inventors: Robert D. Vanasse, Columbia; Frank Figdore, North Stonington, both of Conn.

[73] Assignee: The United States of America as represented by the Secretary of the Navy, Washington, D.C.

[21] Appl. No.: 150,360

[22] Filed: Dec. 22, 1987

[51] Int. Cl.⁶ .................................................. F16G 11/00
[52] U.S. Cl. ........................ 24/122.6; 24/129 R; 24/130
[58] Field of Search ........................... 24/115 R, 122.6, 24/115 K, 115 M, 136 R, 136 K, 136 L, 129 R, 130

[56] References Cited

U.S. PATENT DOCUMENTS

| | | | |
|---|---|---|---|
| 4,184,784 | 1/1980 | Killian | 24/122.6 |
| 4,241,427 | 12/1980 | Swenson | 367/20 |
| 4,597,065 | 6/1986 | Lien | 367/20 |

Primary Examiner—Harold J. Tudor
Assistant Examiner—Christopher K. Montgomery
Attorney, Agent, or Firm—Michael J. McGowan; Prithvi C. Lall; Michael F. Oglo

[57] ABSTRACT

A termination device and a method for terminating braided ropes or cables of aramid fiber are described. The device includes a generally cylindrical coupling which is threaded at one longitudinal end and has an internal sleeve at the opposite longitudinal end thereof. The longitudinal end of the coupling surrounding the internal sleeve has an annular space for feeding aramid fibers therethrough and also has a smooth surface with curved end toward the threaded longitudinal end for flexion of the aramid fibers for bent over the smooth surface and has properly contoured second curved end away from the longitudinal end to prevent damage to the bent over aramid fibers.

6 Claims, 1 Drawing Sheet

5,539,960

CYLINDRICAL CONVEX DOORKNOB TERMINATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to tow cables for underwater applications and more particularly to a termination device and a method for terminating braided ropes or cables of aramid fiber to increase the reliability of such cables.

2. State of Prior Art

As described in U.S. Pat. No. 4,184,784 to Killian the introduction of aramid fibers having great tensile strength has made possible a number of applications for lightweight high strength cables for underwater applications and arrays. The major advantage of using aramid cables is that they are light-weight compared to cables made of steel and provide extra strength. It is to be noted that such cables have been marketed under the trade name "KEVLAR" which is a trademark of Dupont Corporation and they require special handling. One of the characteristics of aramid fibers is that they retain their tensile strength right up to the breaking point. Consequently, it has been found to be a very difficult problem to provide a satisfactory termination for such cables since any significant variation in strand length causes the load to be carried to the shortest length strand until it breaks and then the load being transferred to the next available shortest piece, etc. with each strand failing under load until all are broken. It is thus quite important that terminating a cable or rope of KEVLAR is done carefully to maximize the strength of the rope at termination. Various techniques have been used in the prior art with limited success. As an example, Killian, as described in U.S. Pat. No. 4,184,784 which is incorporated herein by reference, uses a tapered coupling having a central sleeve passing through the axis of that coupling. KEVLAR strands or braids or fibers are passed through the annular space between the coupling and the central sleeve and a wedge is inserted from the opposite end to secure the position of the KEVLAR cable after it has passed through the sleeve. However, it has been reported that the results obtained with the termination procedure described and claimed in the above mentioned patent to Killian meets partial success in that the strength of the termination of the KEVLAR cable is up to about 50% to 70% of its original strength. There is thus still a need to improve the termination device and a terminating procedure so as to improve the strength of the cable up to its normal strength at the termination point.

SUMMARY OF THE INVENTION

The objectives, advantages of the present invention are accomplished by utilizing a termination coupling which is generally a longitudinal cylinder with a first longitudinal end having threads thereon. The second longitudinal end of the coupling includes a sleeve inside the outer surface thereof and having an annular space between the outer surface of the coupling at the second end and the internal sleeve therein. The sleeve may be either an integral part of the coupling or it can be a separate piece housed inside the second longitudinal end of the coupling by using shearing pins. The KEVLAR braided rope or strands are fed through the annular space between the internal sleeve and the outer surface at the second longitudinal end. The outer surface has smooth curved ends at both sides thereof. The KEVLAR strands which are fed through the annular space are bent over the outer smooth surface at the second longitudinal end of the coupling and are then terminated back into themselves using an industry standard method termed as "chinese finger" where the free end of each KEVLAR braid is inserted using a fid to a predetermined depth into the hollow core formed when the helix of the braided rope is spread by pushing the rope on each end by means of the fid. The curved ends of the outer surface at the second longitudinal end of the coupling are such that a first bend (closer to the first end of the coupling) is used for flexion of bent over KEVLAR fibers or braids and a second bend (closer to the second end) of the outer surface is curved so as to have a radius of curvature at least three times the diameter of the KEVLAR strand or fiber or braid in order to prevent any sharp edges which may damage the KEVLAR strands. The use of this coupling improves the strength of the KEVLAR strands at the termination point to 85% to 90% of the regular strength.

An object of subject invention is the improvement of strength of the KEVLAR strands at the termination point and which is used for underwater tow cables and arrays.

Another object of subject invention is to improve the efficiency of the KEVLAR strands by providing smooth surface to increase flexion and improve the overall strength thereof at the termination point.

Still another object of subject invention is to provide an appropriate termination curvature that minimizes the array inner diameter, while at the same time maximizing array tensile strength by essentially doubling the KEVLAR strength at the termination so as to reduce the amount of KEVLAR braided rope required circumferentially to sustain maximum tensile strength.

Still another object of subject invention is to provide threaded end at one end of the coupling which can be used for performing pull test on the cable after appropriate termination.

Other objects, advantages, and features will become apparent from the following detailed description of the invention when considered in conjunction with the drawings wherein:

DESCRIPTION OF A PREFERRED EMBODIMENT

Figure 1:
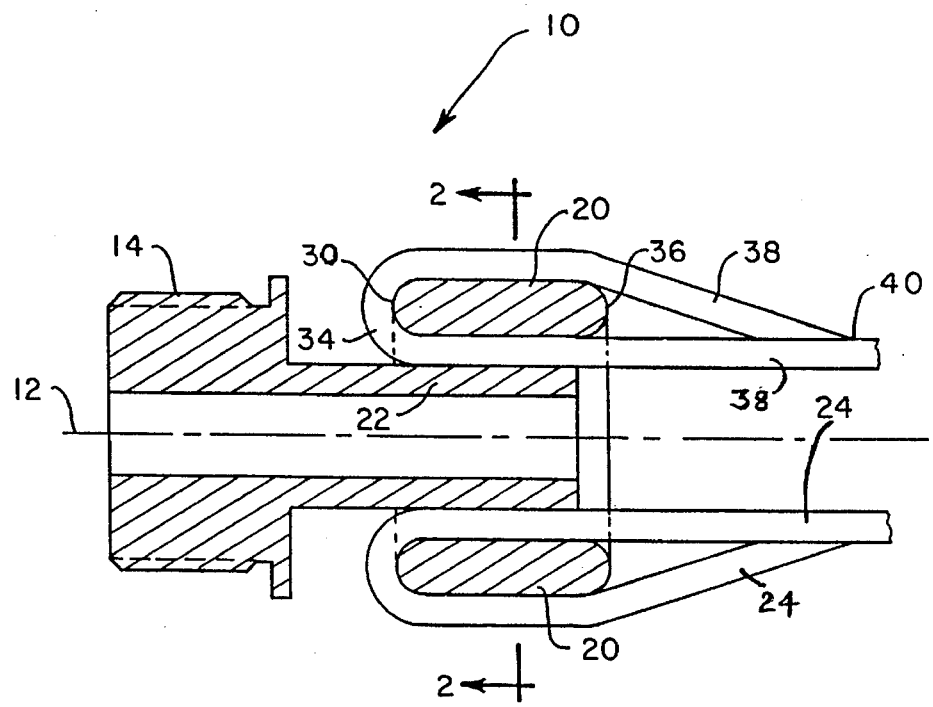
FIG. 1 is a partially cross-sectional view of the coupling for termination according to the teachings of subject invention.

Referring to the drawings wherein like reference characters designate identical corresponding parts throughout the several figures and more particularly to FIG. 1 thereof, a partially cross-sectional view of the termination coupling 10 is shown. Coupling 10 is a longitudinal cylinder having an end 14 which is threaded for a pull test to put the KEVLAR termination under test for measuring its strength after termination. The axis of the cylindrical coupling is 12 and internal sleeve 22 is housed inside outer surface 20 of the coupling at the outer end thereof. Sleeve 22 forms an integral part of the coupling. It should be noted however that the internal sleeve 22 can be housed as a separate piece using a series of shear pins for attaching it to surface 20. Surface 20 is provided for bending thereover KEVLAR braided rope such as 38 which after bending over brought as fibers such as 36 so as to join to KEVLAR rope 38 at a point 40 where it can be terminated by a chinese finger to KEVLAR rope 38. The curvature of surface 20 at first end 30 is smooth and is used for flexion of the bent over KEVLAR rope 38 and the curvature at point 36 of the second end of 20 is chosen so that the radius of curvature at that end is at least three times the diameter of the KEVLAR fiber 38 in order to minimize the array inner diameter at the termination, while maximizing the strength of the KEVLAR braided rope.

Figure 2:
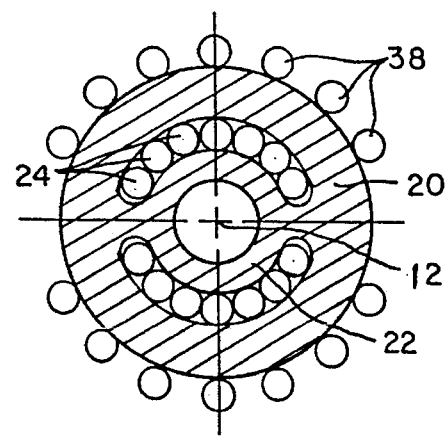
FIG. 2 is a cross-section of FIG. 1 taken along line 2—2 thereof.

FIG. 2 is a cross section of FIG. 1 taken along line 2—2 thereof and the KEVLAR braided ropes such as 38 which are passed through the annular space between surface 20 and internal sleeve 22 and then bent over at end 30 so as to be bent back as rope 38 and joining rope 38. In operation, various KEVLAR braided ropes of the same length such as 38 are fed through the annular space between the internal sleeve 22 and surface 20 and are bent over at the first end of surface 20 over the curved surface 34 and brought back to join KEVLAR braided rope 38 after bending over the surface area 20, until all have been terminated and have the same length. The radius of curvature at point 36 at the second end was chosen to be at least of radius three times the diameter of the KEVLAR braided ropes so as to increase termination efficiency by reducing abrasion of the fibers during flexion. The KEVLAR fiber 38 is then terminated to KEVLAR strand 38 by a chinese finger to retain its original strength. Similar treatment can be given to fibers such as 24 as shown in FIG. 1. This arrangement provides at least 85% to 95% of the original KEVLAR fiber strength after the termination.

Briefly stated, a termination coupling according to the teachings of subject invention is a cylindrical longitudinal piece having one end thereof threaded for providing pull test after termination and the other end thereof is provided with an internal sleeve so as to provide an annular space between the outer surface at that end and the internal sleeve. The curvature of the surface at the other end is chosen so as to provide flexion of the bent over KEVLAR fibers and to provide appropriate curvature in order to minimize damage to the bent over KEVLAR fiber which joins the original KEVLAR fiber and is bonded to it by using glue or epoxy.

Modification and variation of the present invention are possible in light of the above teachings. As an example, the material of which the coupling is made of can vary without deviating from the teachings of subject invention. Furthermore, the internal sleeve can either be an integral part of the coupling or it can be a separate piece which is housed inside the coupling. It is therefore to be understood that within the scope of the appended claims the invention may be practiced otherwise than as specifically described.

What is claimed is:

1. A termination coupling for terminating KEVLAR fibers for an underwater cable or an array which comprises:

a longitudinal cylinder having a first end and a second end thereof, said second end having a smooth surface with contoured ends thereof; and an internal sleeve member inside the smooth surface at the second end of said cylinder providing an annular space therebetween for passing KEVLAR fibers therethrough and bending them over said smooth surface.

2. The termination coupling of claim 1 wherein said internal sleeve as an integral part of said coupling.

3. The termination coupling of claim 1 wherein said internal sleeve is secured inside the smooth surface of said coupling using a plurality of shear pins.

4. The termination coupling of claim 1 wherein said first end of said cylinder is threaded for performing pull test after termination of KEVLAR fibers.

5. The termination coupling of claim 3 wherein the radius of curvature of the smooth surface at the extreme end of said second end is at least three times the diameter of the KEVLAR fibers bent over the smooth surface.

6. A method for terminating KEVLAR fibers to preserve the strength thereof after termination using a termination coupling comprising a longitudinal cylinder threaded at one end and a smooth surface at the other end and having an internal sleeve therein and an annular space therebetween, said method including the steps of:

feeding KEVLAR fibers through said annular space;

bending the KEVLAR fibers over the said smooth surface at the second end of said cylinder after feeding the KEVLAR through said annular space; and joining the bent over KEVLAR fibers to the original KEVLAR fibers.

\* \* \* \* \*